US012695695B2

(12) United States Patent
Rajendran et al.

(10) Patent No.: US 12,695,695 B2
(45) Date of Patent: Jul. 28, 2026

(54) PROVIDING A MESSAGE ASSOCIATED WITH A PERFORMANCE ISSUE OF A TRANSIT NODE THAT IS ASSOCIATED WITH A LABEL SWITCHED PATH

(71) Applicant: Juniper Networks, Inc., Sunnyvale, CA (US)

(72) Inventors: Kamalesh Rajendran, Sunnyvale, CA (US); Suresh Kumar Boyapati, Santa Clara, CA (US); Nischal Singh, Nepean (CA)

(73) Assignee: Hewlett Packard Enterprise Development LP, Houston, TX (US)

( * ) Notice: Subject to any disclaimer, the term of this patent is extended or adjusted under 35 U.S.C. 154(b) by 198 days.

(21) Appl. No.: 18/338,040

(22) Filed: Jun. 20, 2023

(65) Prior Publication Data

US 2024/0430196 A1     Dec. 26, 2024

(51) Int. Cl.
*H04L 45/50* (2022.01)
*H04L 47/12* (2022.01)

(52) U.S. Cl.
CPC .............. *H04L 45/50* (2013.01); *H04L 47/12* (2013.01)

(58) Field of Classification Search
CPC ......... H04L 45/50; H04L 47/12; H04L 43/10; H04L 45/28; H04L 45/70
See application file for complete search history.

(56) References Cited

U.S. PATENT DOCUMENTS

| | | | | |
|---|---|---|---|---|
| 7,359,377 | B1 * | 4/2008 | Kompella | H04L 45/50 |
| | | | | 370/254 |
| 7,940,695 | B1 * | 5/2011 | Bahadur | H04L 47/10 |
| | | | | 370/254 |
| 8,472,346 | B1 * | 6/2013 | Bahadur | H04L 43/0811 |
| | | | | 370/254 |
| 8,717,899 | B2 | 5/2014 | Boutros et al. | |
| 8,913,490 | B1 | 12/2014 | Barman et al. | |
| 9,680,734 | B1 * | 6/2017 | Tiruveedhula | H04L 45/16 |
| 11,632,316 | B2 * | 4/2023 | Sinha | H04L 43/0805 |
| | | | | 370/252 |
| 2008/0316920 | A1 * | 12/2008 | Chun | H04L 45/50 |
| | | | | 370/225 |
| 2011/0128844 | A1 * | 6/2011 | Sun | H04L 45/00 |
| | | | | 370/217 |
| 2011/0128968 | A1 * | 6/2011 | Kompella | H04L 45/50 |
| | | | | 370/410 |

(Continued)

OTHER PUBLICATIONS

Extended European Search Report for European Application No. EP241825892 dated Oct. 31, 2024, 14 pages.

*Primary Examiner* — Oanh Duong
(74) *Attorney, Agent, or Firm* — Harrity & Harrity, LLP

(57) ABSTRACT

In some implementations, a transit node associated with a label switched path (LSP), may identify a performance issue of the transit node. The transit node may generate, based on identifying the performance issue, a message associated with the performance issue. The transit node may send, to an ingress node associated with the LSP, the message to allow the ingress node to perform one or more actions associated with the LSP. The one or more actions associated with the LSP may include performance of an assessment operation associated with the LSP and/or initiation of a termination operation associated with the LSP.

20 Claims, 9 Drawing Sheets

(56)         References Cited

U.S. PATENT DOCUMENTS

| | | | |
|---|---|---|---|
| 2011/0199891 A1* | 8/2011 | Chen | H04L 45/50 |
| | | | 370/255 |
| 2013/0301402 A1* | 11/2013 | Ceccarelli | H04L 45/22 |
| | | | 370/216 |
| 2014/0003803 A1* | 1/2014 | Sfeir | H04L 45/02 |
| | | | 398/7 |
| 2014/0071834 A1* | 3/2014 | Sun | H04L 45/507 |
| | | | 370/242 |
| 2014/0254353 A1* | 9/2014 | Ye | H04L 45/22 |
| | | | 370/228 |
| 2014/0347979 A1* | 11/2014 | Tanaka | H04L 41/0686 |
| | | | 370/225 |
| 2014/0369185 A1 | 12/2014 | Chen | |
| 2016/0014029 A1* | 1/2016 | Yuan | H04L 45/50 |
| | | | 370/236 |
| 2017/0244621 A1* | 8/2017 | Kompella | H04L 45/22 |
| 2018/0351787 A1* | 12/2018 | Boyapati | H04L 41/0661 |
| 2020/0084147 A1* | 3/2020 | Gandhi | H04L 43/20 |
| 2020/0366601 A1* | 11/2020 | Singh | H04L 45/22 |

* cited by examiner

510    Identify a performance issue of the transit node

520    Generate a message associated with the performance issue

530    Send the message

500

600

610 Receive a message associated with a performance issue of a transit node associated with the LSP 620 Perform one or more actions associated with the LSP

PROVIDING A MESSAGE ASSOCIATED WITH A PERFORMANCE ISSUE OF A TRANSIT NODE THAT IS ASSOCIATED WITH A LABEL SWITCHED PATH

BACKGROUND

A label switched path (LSP) is a predetermined path or tunnel established in a network, such as multiprotocol label switching (MPLS) network or a resource reservation proto- col (RSVP) MPLS network, to route packets from a source to a destination.

SUMMARY

In some implementations, a method includes identifying, by a transit node associated with a label switched path (LSP), a performance issue of the transit node; generating, by the transit node and based on identifying the performance issue, a message associated with the performance issue; and sending, by the transit node, and to an ingress node associ- ated with the LSP, the message to allow the ingress node to perform one or more actions associated with the LSP.

In some implementations, an ingress node associated with an LSP includes one or more memories; and one or more processors to: receive, from a transit node associated with the LSP, a message associated with a performance issue of the transit node; and perform, based on the message, one or more actions associated with the LSP.

In some implementations, a non-transitory computer- readable medium storing a set of instructions includes one or more instructions that, when executed by one or more processors of a transit node associated with an LSP, cause the transit node to: generate, based on identifying a perfor- mance issue of the transit node, a message associated with the performance issue; and send, to an ingress node associ- ated with the LSP, the message to allow the ingress node to perform one or more actions associated with the LSP.

DETAILED DESCRIPTION

Figure 1A:
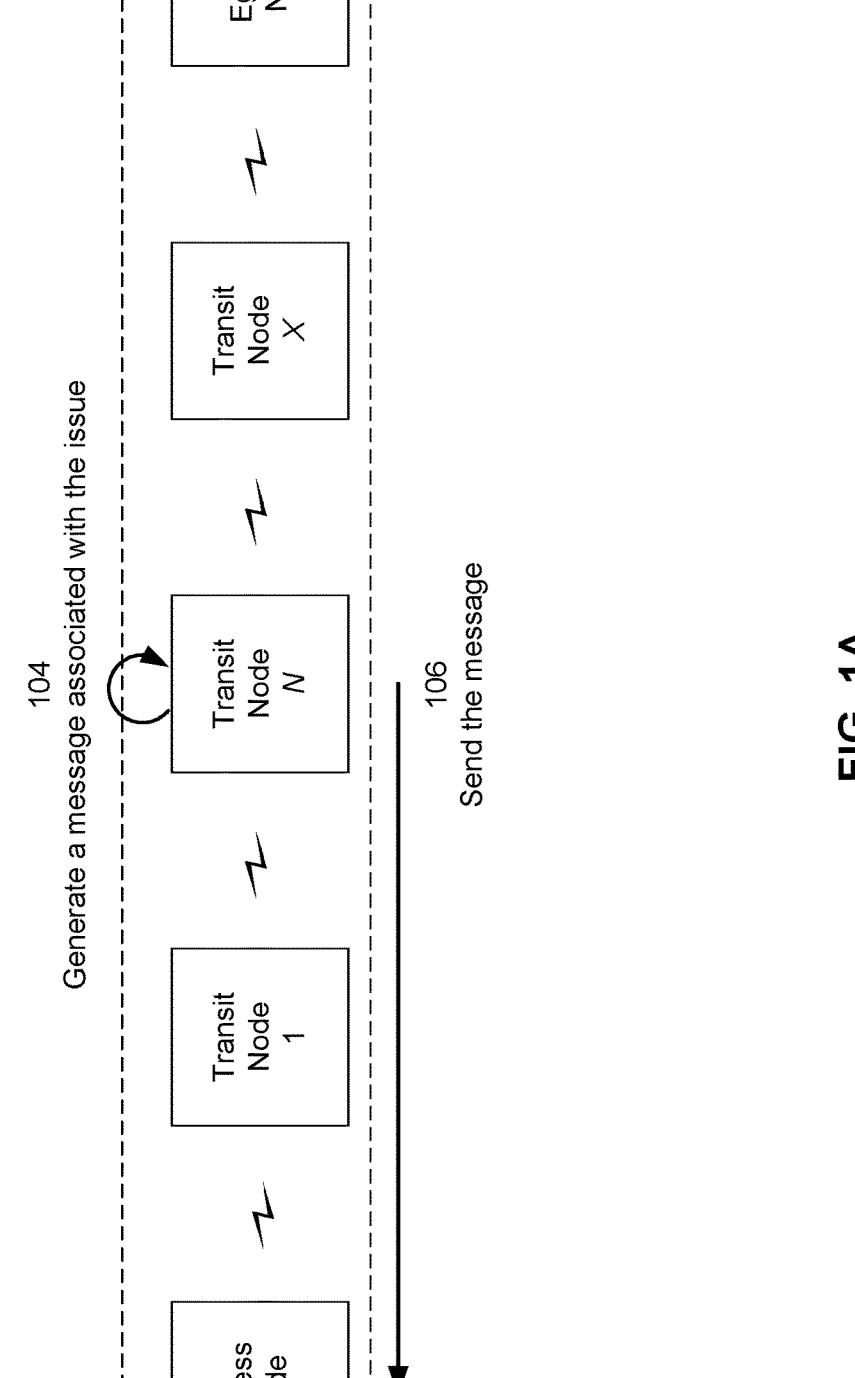
FIGS. 1A-1D are diagrams of an example implementation associated with providing a message indicating an issue with a performance of a transit node that is associated with an LSP.

The following detailed description of example implemen- tations refers to the accompanying drawings. The same reference numbers in different drawings may identify the same or similar elements.

An LSP typically includes an ingress node, an egress node, and one or more transit nodes, where a path is defined from the ingress node to the egress node via the one or more transit nodes. In many cases, a transit node of the LSP encounters a performance issue (e.g., a hardware issue and/or a software issue that affects its performance), which impacts its ability to forward traffic (e.g., traffic associated with the LSP, or other traffic received by the transit node). For example, the performance issue may cause the transit node to drop traffic, misroute traffic, and/or otherwise incor- rectly handle traffic. However, the ingress node of the LSP is not able to determine that the transit node is affected by the performance issue, and therefore continues to attempt to send traffic to the egress node via the LSP. Consequently, because the transit node is affected by the performance issue, some or all of the traffic does not reach the egress node. This is often referred to as traffic blackholing.

Some implementations described herein include an ingress node, one or more transit nodes, and an egress node that are associated with an LSP. A transit node, of the one or more transit nodes, identifies a performance issue of the transit node (e.g., a hardware issue, a software issue, and/or another issue that detrimentally impacts the performance of the transit node). The transit node generates, based on identifying the performance issue, a message associated with the performance issue, and sends the message to the ingress node associated with the LSP. This allows the ingress node to perform one or more actions associated with the LSP. For example, the ingress node may perform an assess- ment operation (e.g., an LSP self-ping assessment operation, an LSP ping assessment operation, or another assessment operation) that is configured to assess a status of the LSP. As an additional, or alternative, example, the ingress node may initiate a termination operation associated with the LSP (e.g., to allow a new LSP to be established from the ingress node to the egress node that does not include the transit node with the performance issue).

In this way, by providing a message associated with the performance issue, the transit node notifies the ingress node of the performance issue of the transit node (e.g., that may impact the status of the LSP). This allows the ingress node to perform an assessment operation associated with the LSP and/or to initiate a termination operation associated with the LSP. Accordingly, the ingress node may determine that the performance issue of the transit node (e.g., that causes the transit node to drop traffic, misroute traffic, and/or otherwise incorrectly handle traffic) affects the LSP, and the ingress node may thereby cause a new LSP to be established from the ingress node to the egress node. This minimizes, or prevents, traffic blackholing (e.g., that would otherwise result from maintaining an LSP that includes the transit node with the performance issue) for traffic that originates at the ingress node and is destined for the egress node.

Further, because the transit node notifies the ingress node as soon as the transit node identifies the performance issue, the ingress node is able to timely address any traffic black- holing resulting from the performance issue of the transit node. This therefore minimizes use of computing resources (e.g., processing resources, memory resources, communica- tion resources, and/or power resources, among other examples) of the ingress node, and/or of other nodes or computing devices, that would otherwise be needed to resend traffic, to test and inspect performances of transit nodes associate with the LSP, and/or to otherwise address issues resulting from traffic blackholing.

FIGS. 1A-1D are diagrams of an example implementation 100 associated with providing a message indicating a per- formance issue of a transit node that is associated with an LSP. As shown in FIGS. 1A-1D, example implementation

100 includes one or more ingress nodes, one or more transit nodes, and one or more egress nodes. These devices are described in more detail below in connection with FIGS. 2-4.

Figure 1B:
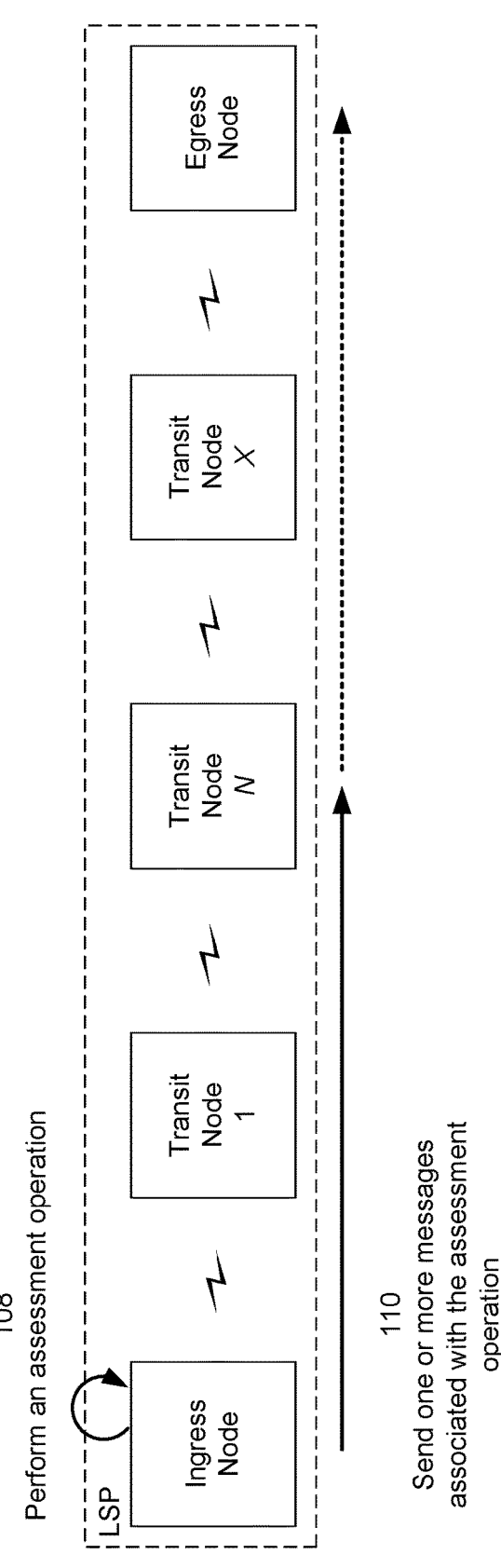
Figure 1C:
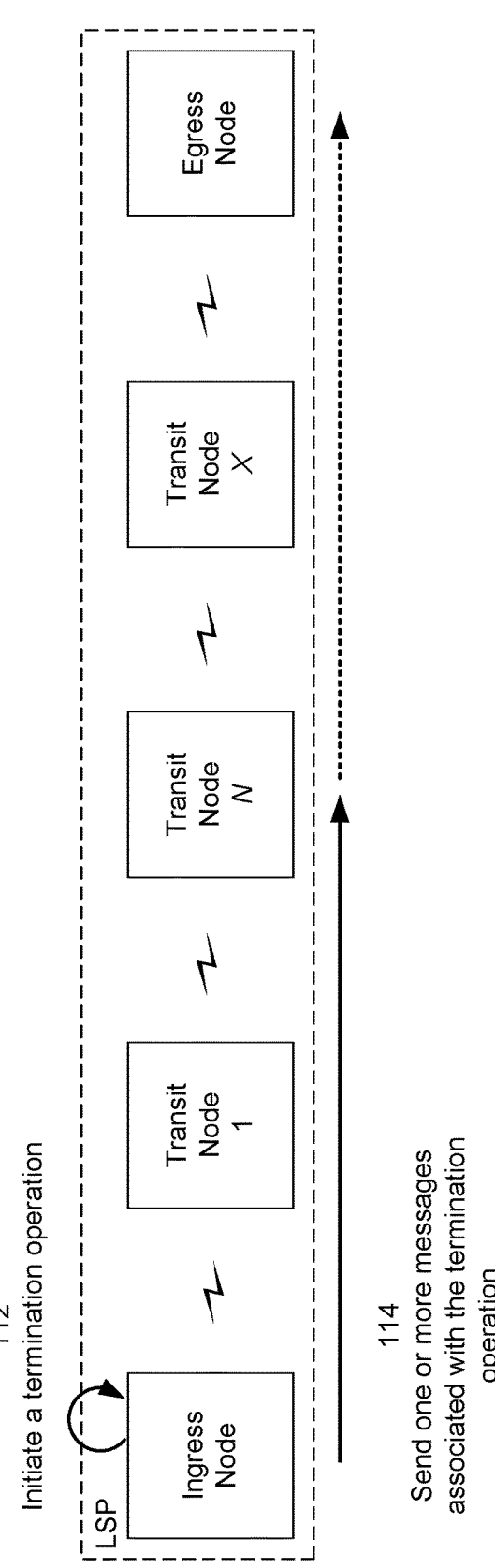
Figure 1D:
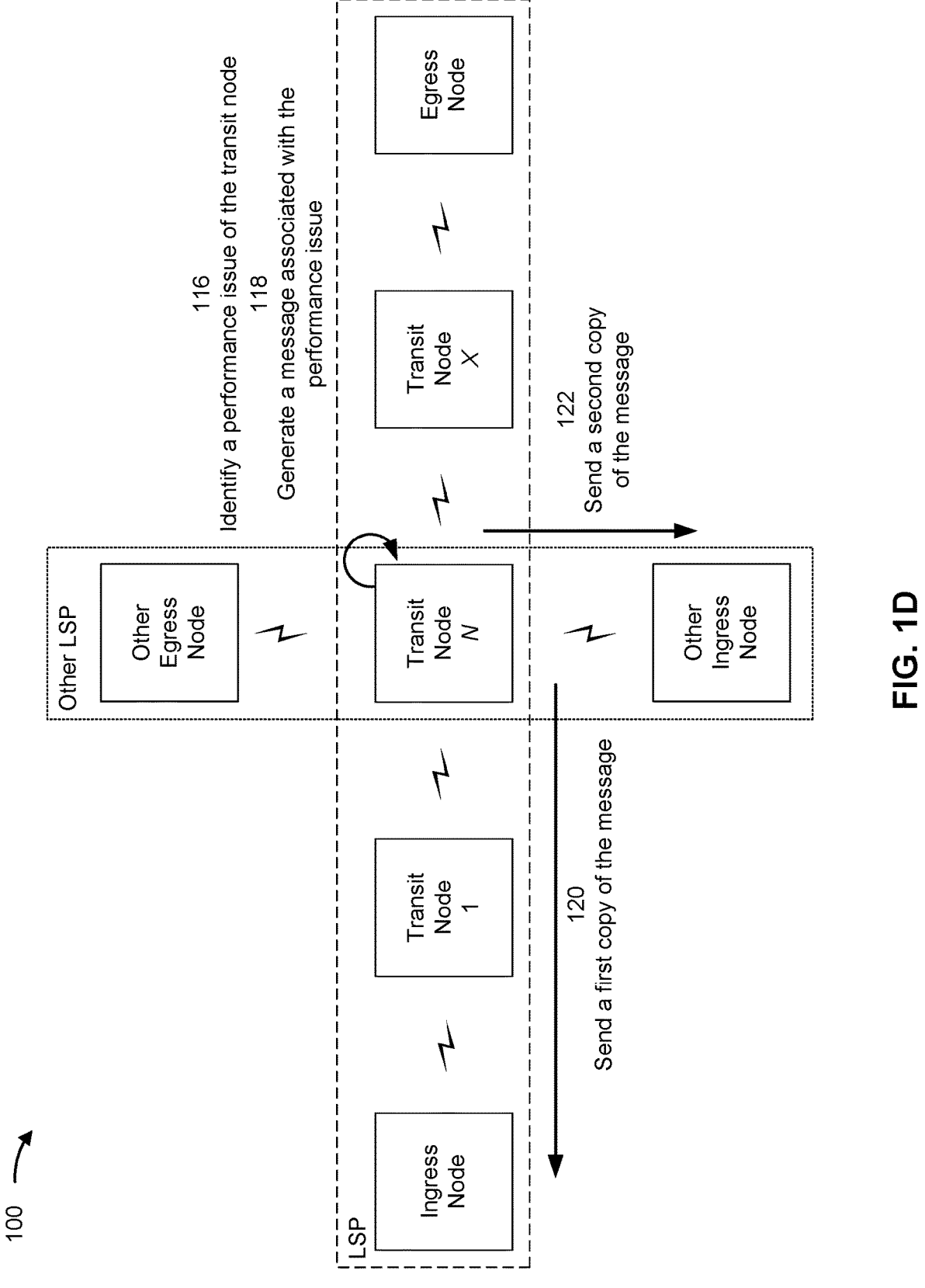

An LSP from an ingress node to an egress node may include a plurality of transit nodes. For example, as shown in FIGS. 1A-1C, an LSP from an ingress node to an egress node may include a transit node 1, a transit node N, and a transit node X (e.g., with one or more additional transit nodes between transit node 1 and the transit node N and/or between transit node N and transit node X). In some implementations, a transit node of the LSP may be part of another LSP. For example, as shown in FIG. 1D, the transit node N may be included in another LSP that includes another ingress node and another egress node. Each LSP may be, for example, an MPLS LSP, an RSVP MPLS LSP, or another type of LSP.

As shown in FIG. 1A, and by reference number 102, the transit node N may identify a performance issue of the transit node N. In some implementations, the transit node N may monitor a performance (e.g., a routing performance) of the transit node N, and may, based on monitoring the transit node N, identify a performance issue associated with the transit node N. For example, the transit node N may monitor data, such as telemetry data, associated with the performance of the transit node N, and may identify one or more issue codes (e.g., one or more trap codes, such as associated with a packet forwarding engine (PFE) of the transit node N; one or more exception codes; and/or one or more other issue codes). The transit node N then may analyze the one or more issue codes (e.g., process the one or more issue codes using at least one analysis technique) to determine the performance issue of the transit node N. The performance issue may be, for example, a hardware issue, a software issue, and/or another issue that detrimentally impacts the performance of the transit node N. For example, the performance issue may cause the transit node N to drop traffic, misroute traffic, and/or otherwise incorrectly handle traffic (e.g., traffic associated with the LSP, traffic associated with another LSP, or any other traffic).

As shown by reference number 104, the transit node N may generate a message associated with the performance issue (e.g., based on identifying the performance issue). The message may be, for example, an RSVP path error message described by Internet Engineering Task Force (IETF) Request for Comments (RFC) 5284. A format of the RSVP path error message may be extended to support an error specification object (e.g., a user defined error specification code, with, for example, an error code of 33), which may indicate the performance issue and/or may include one or more instructions to perform one or more actions associated with the LSP (e.g., to perform an assessment operation associated with the LSP, to initiate a termination operation associated with the LSP, and/or to perform another action associated with the LSP, as described herein).

As shown by reference number 106, the transit node N may send the message to the ingress node of the LSP. For example, the transit node N may send the message to the transit node 1 (or to another transit node between the transit node 1 and the transit node N) to cause the message to propagate, via the LSP, to the ingress node. In this way, the ingress node may receive the message from the transit node N.

In some implementations, the transit node N may send the message to the ingress node to allow the ingress node to perform one or more actions associated with the LSP. For example, the ingress node may process (e.g., parse and/or read) the message and may thereby determine to (or determine not to) perform the one or more actions. In some implementations, when the message includes the one or more instructions to perform the one or more actions, the ingress node may execute the one or more instructions to thereby cause the ingress node to perform the one or more actions. The one or more actions may include, for example, performance of an assessment operation associated with the LSP (e.g., as further described herein in relation to FIG. 1B), initiation of a termination operation associated with the LSP (e.g., as further described herein in relation to FIG. 1C), and/or another operation associated with the LSP.

While some implementations described herein include the transit node N performing one or more operations (e.g., related to identifying a performance issue, generating a message, and sending the message) additional implementations include any other node included in the LSP, other than an ingress node of the LSP, performing the one or more operations. For example, another transit node (e.g., the transit node 1 or the transit node X) or the egress node in the LSP may perform the one or more operations.

As shown in FIG. 1B, and by reference number 108, the ingress node may perform an assessment operation associated with the LSP (e.g., as one of the one or more actions described herein in relation to FIG. 1A). The assessment operation may be, for example, an LSP self-ping assessment operation (e.g., as described by RFC 7746), an LSP ping assessment operation (e.g., as described by RFC 8029), or another assessment operation configured to assess a status of an LSP. Accordingly, as shown by reference number 110, the ingress node may send one or more messages associated with the assessment operation (e.g., one or more LSP self-ping assessment operation messages, one or more LSP ping assessment operation messages, and/or one or more other messages). The ingress node may send the one or more messages to the transit node 1 to cause the one or more messages to propagate, via the LSP, to other transit nodes (including the transit node N) and/or the egress node. In this way, the transit node N may receive the one or more messages from the ingress node (e.g., in association with the assessment operation).

Based on sending the one or more messages (and, in some implementations, receiving, or not receiving, responses to the one or more messages), the ingress node may determine a status of the LSP (e.g., a "healthy" status indicating that traffic can be routed via the LSP, or an "unhealthy" status indicating that traffic cannot be routed via the LSP). When the ingress node determines that the LSP has a healthy status, the ingress node may cease performing any other actions, or may perform one or more additional assessment operations (e.g., in a similar manner as that described herein), such as on a scheduled basis (e.g., every ten minutes for the next hour). Alternatively, when the ingress node determines that the LSP has an unhealthy status, the ingress node may initiate a termination operation (e.g., as described herein in relation to FIG. 1C). The ingress node then, or prior to initiating the termination operation, may cause a new LSP to be established between the ingress node and the egress node (e.g., that does not include the transit node N).

As shown in FIG. 1C, and by reference number 112, the ingress node may initiate a termination operation associated with the LSP (e.g., as one of the one or more actions described herein in relation to FIG. 1B). The termination operation may be, for example, an LSP path tear down operation (e.g., that is to cause the LSP to be terminated). Accordingly, as shown by reference number 114, the ingress node may send one or more messages associated with the termination operation (e.g., one or more LSP path tear down operation messages). The ingress node may send the one or more messages to the transit node 1 to cause the one or more messages to propagate, via the LSP, to other transit nodes (including the transit node N) and/or the egress node. In this way, the transit node N may receive the one or more messages from the ingress node (e.g., in association with the termination operation). Further, by initiating the termination operation, the ingress node may cause the LSP to terminate, which prevents traffic that is to be routed from the ingress node to the ingress node from propagating through the transit node N.

As shown in FIG. 1D, the transit node N may be included in one or more LSPs (e.g., the LSP described herein in relation to FIGS. 1A-1C, and another LSP). As shown by reference numbers 116 and 118, the transit node N may identify a performance issue of the transit node N, and may generate a message associated with the performance issue (e.g., in a similar manner as that described herein in relation to FIG. 1A and reference numbers 102 and 104).

As further shown in FIG. 1D, and by reference number 120, the transit node N may send a first copy of the message to the ingress node of the LSP (e.g., in a similar manner as that described herein in relation to FIG. 1A and reference number 108), which may allow the ingress node to perform one or more actions associated with the LSP (e.g., in a similar manner as that described herein in relation to FIGS. 1B-1C). For example, sending the first copy of the message may allow the ingress node to perform an assessment operation associated with the LSP (and thereby send, such as to the transit node N, one or more messages associated with the assessment operation). As another example, sending the first copy of the message may allow the ingress node to initiate a termination operation associated with the LSP (and thereby send, such as to the transit node N, one or more messages associated with the termination operation).

As further shown in FIG. 1D, and by reference number 122, the transit node N may send a second copy of the message to the other ingress node of the other LSP (e.g., in a similar manner as that described herein in relation to FIG. 1A and reference number 108), which may allow the other ingress node to perform one or more actions associated with the other LSP (e.g., in a similar manner as that described herein in relation to FIGS. 1B-1C). For example, sending the second copy of the message may allow the other ingress node to perform an assessment operation associated with the other LSP (and thereby send, such as to the transit node N, one or more messages associated with the assessment operation). As another example, sending the second copy of the message may allow the other ingress node to initiate a termination operation associated with the other LSP (and thereby send, such as to the transit node N, one or more messages associated with the termination operation).

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
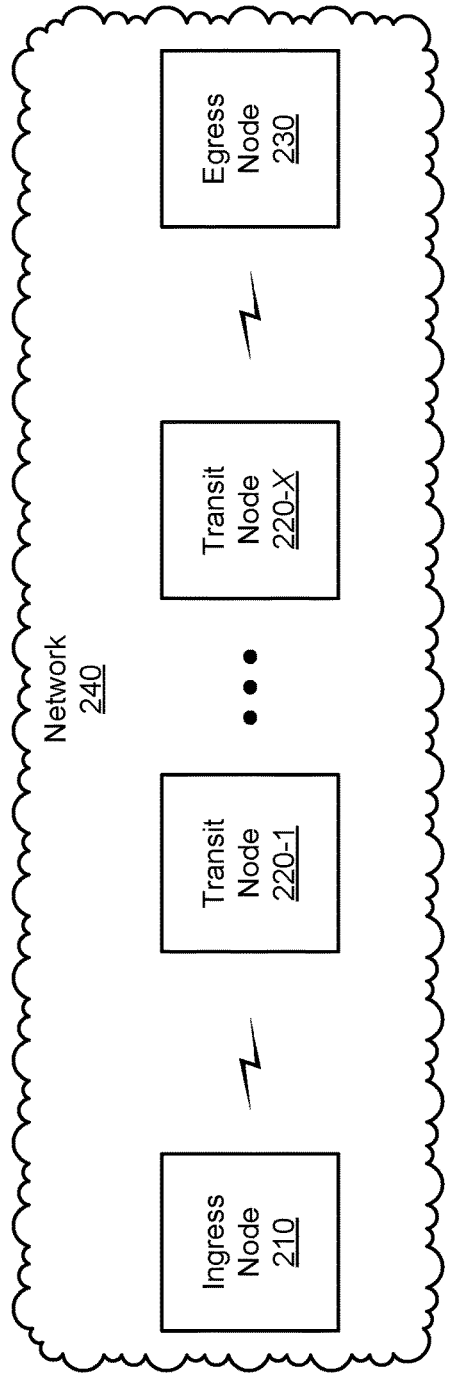
FIG. 2 is a diagram of an example environment in which systems and/or methods described herein may be imple- mented.

FIG. 2 is a diagram of an example environment 200 in which systems and/or methods described herein may be implemented. As shown in FIG. 2, environment 200 may include an ingress node 210, a group of transit nodes 220 (shown as transit node 220-1 through transit node 220-X), an egress node 230, and a network 240. Devices of environment 200 may interconnect via wired connections, wireless connections, or a combination of wired and wireless connections. The ingress node 210, the group of transit nodes 220, and the egress node 230 may be included in an LSP in the network 240.

Ingress node 210 includes one or more devices capable of receiving, generating, storing, processing, and/or providing information, such as information described herein. For example, ingress node 210 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device, or a similar type of device. In some implementations, ingress node 210 may receive network traffic from and/or may provide network traffic to other ingress nodes 210 and/or egress node 230, via network 240 (e.g., by routing packets via the LSP, using transit nodes 220 as intermediaries).

Transit node 220 includes one or more devices capable of receiving, processing, storing, routing, and/or providing traffic (e.g., a packet or other information or metadata) in a manner described herein. For example, transit node 220 may include a router, such as a label switching router (LSR), a label edge router (LER), an ingress router, an egress router, a provider router (e.g., a provider edge router or a provider core router), a virtual router, or another type of router. Additionally, or alternatively, transit node 220 may include a gateway, a switch, a firewall, a hub, a bridge, a reverse proxy, a server (e.g., a proxy server, a cloud server, or a data center server), a load balancer, and/or a similar device. In some implementations, transit node 220 may be a physical device implemented within a housing, such as a chassis. In some implementations, transit node 220 may be a virtual device implemented by one or more computer devices of a cloud computing environment or a data center. In some implementations, a group of transit nodes 220 may be a group of data center nodes that are used to route traffic flow through network 240.

Egress node 230 includes one or more devices capable of receiving, generating, storing, processing, and/or providing information, such as information described herein. For example, egress node 230 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device, or a similar type of device. In some implementations, egress node 230 may receive network traffic from and/or may provide network traffic to other ingress nodes 210 and/or egress node 230, via network 240 (e.g., by routing packets via the LSP, using transit nodes 220 as intermediaries).

Network 240 includes one or more wired and/or wireless networks. For example, network 240 may include an MPLS network, an RSVP MPLS network, a packet switched network, a cellular network (e.g., a fifth generation (5G) network, a fourth generation (4G) network, such as a long-term evolution (LTE) network, a third generation (3G)

network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
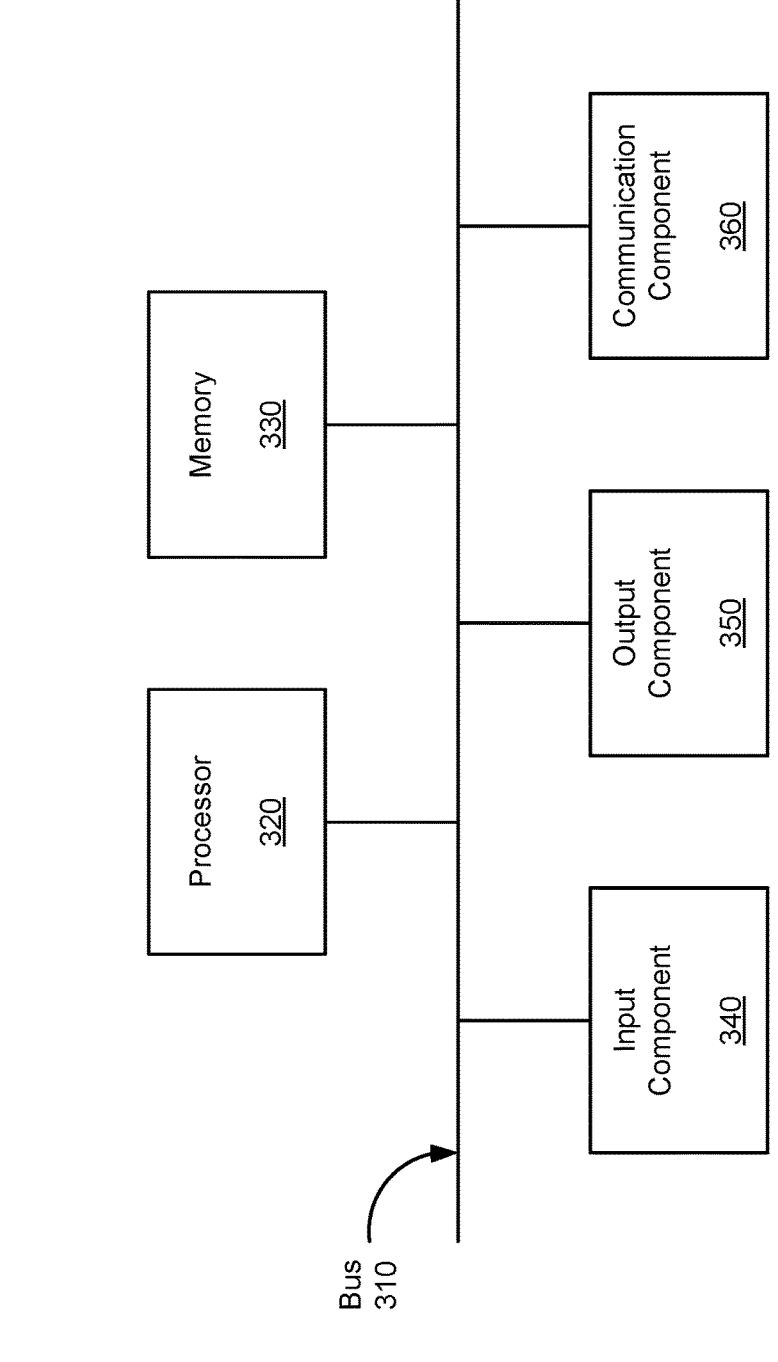
FIG. 3 is a diagram of example components of a device described herein.

FIG. 3 is a diagram of example components of a device 300 associated with providing a message associated with a performance issue of a transit node that is associated with an LSP. The device 300 may correspond to ingress node 210, transit node 220, and/or egress node 230. In some implementations, ingress node 210, transit node 220, and/or egress node 230 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
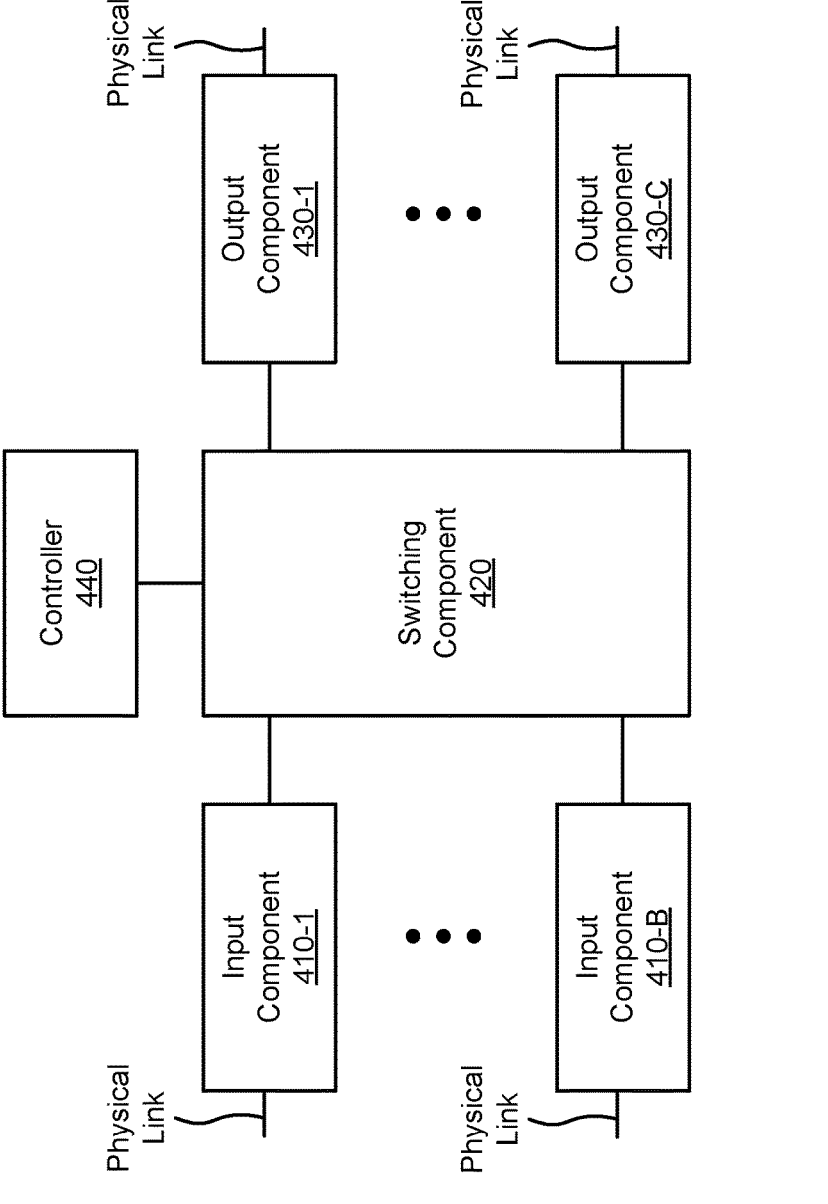
FIG. 4 is a diagram of example components of a device described herein.

FIG. 4 is a diagram of example components of a device 400 associated with providing a message associated with a performance issue of a transit node that is associated with an LSP. Device 400 may correspond to ingress node 210, transit node 220, and/or egress node 230. In some implementations, ingress node 210, transit node 220, and/or egress node 230 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
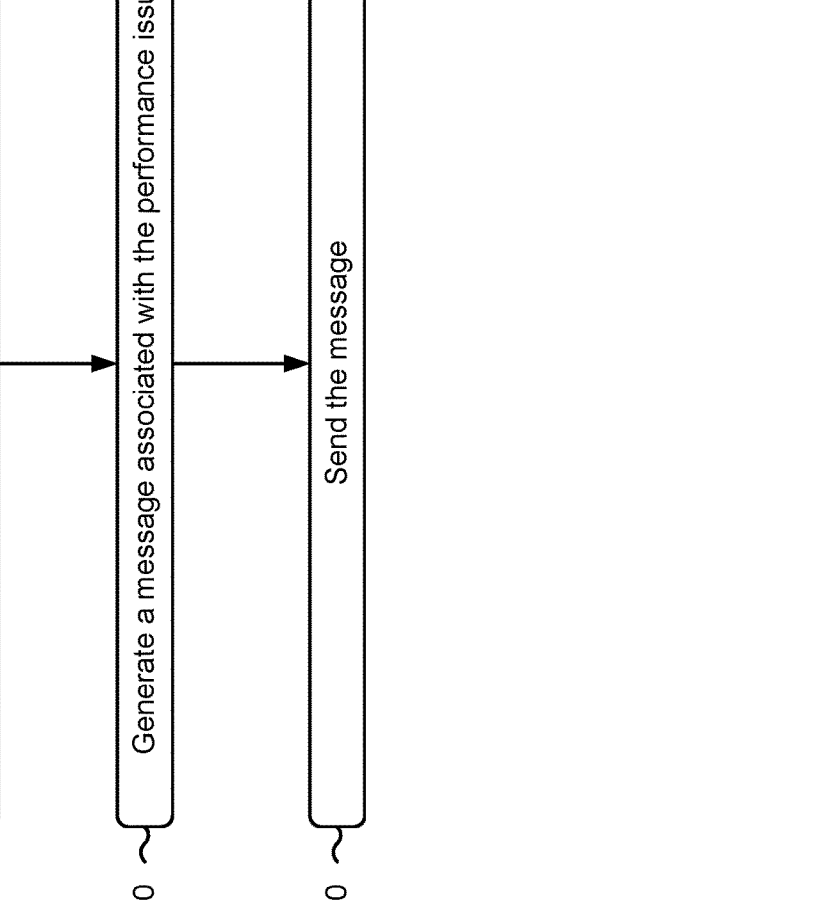
FIG. 5 is a flowchart of an example process associated with providing a message associated with a performance issue of a transit node that is associated with an LSP.

FIG. 5 is a flowchart of an example process 500 associated with providing a message associated with a performance issue of a transit node that is associated with an LSP. In some implementations, one or more process blocks of FIG. 5 are performed by a transit node (e.g., transit node 220) associated with an LSP. In some implementations, one or more process blocks of FIG. 5 are performed by another device or a group of devices separate from or including the transit node, such as an ingress node (e.g., ingress node 210), another transit node (e.g., another transit node 220), and/or an egress node (e.g., egress node 230). Additionally, or alternatively, one or more process blocks of FIG. 5 may be performed by one or more components of device 300, such as processor 320, memory 330, input component 340, output component 350, and/or communication component 360; one or more components of device 400, such as input component 410, switching component 420, output components 430, and/or controller 440; and/or one or more other components.

As shown in FIG. 5, process 500 may include identifying a performance issue of the transit node (block 510). For example, the transit node may identify a performance issue of the transit node, as described above.

As further shown in FIG. 5, process 500 may include generating a message associated with the performance issue (block 520). For example, the transit node may generate, based on identifying the performance issue, a message associated with the performance issue, as described above.

As further shown in FIG. 5, process 500 may include sending the message (block 530). For example, the transit node may send, to an ingress node associated with the LSP, the message, as described above. Sending the message to the ingress node may allow the ingress node to perform one or more actions associated with the LSP.

Process 500 may include additional implementations, such as any single implementation or any combination of implementations described below and/or in connection with one or more other processes described elsewhere herein.

In a first implementation, sending the message allows the ingress node to perform an assessment operation associated with the LSP.

In a second implementation, alone or in combination with the first implementation, process 500 includes receiving, based on sending the message, one or more messages associated with an assessment operation that is associated with the LSP.

In a third implementation, alone or in combination with one or more of the first and second implementations, sending the message allows the ingress node to initiate a termination operation associated with the LSP.

In a fourth implementation, alone or in combination with one or more of the first through third implementations, process 500 includes receiving, based on sending the message, one or more messages associated with a termination operation that is associated with the LSP.

In a fifth implementation, alone or in combination with one or more of the first through fourth implementations, the message sent by the transit node to the ingress node is a first copy of the message, and the transit node is associated with another LSP, and process 500 comprises sending, to another ingress node associated with the other LSP, a second copy of the message to allow the other ingress node to perform one or more other actions associated with the other LSP.

In a sixth implementation, alone or in combination with one or more of the first through fifth implementations, sending the second copy of the message allows the other ingress node to perform an assessment operation associated with the other LSP.

In a seventh implementation, alone or in combination with one or more of the first through sixth implementations, process 500 includes receiving, based on sending the second copy of the message, one or more messages associated with an assessment operation that is associated with the other LSP.

In an eighth implementation, alone or in combination with one or more of the first through seventh implementations, sending the second copy of the message allows the other ingress node to initiate a termination operation associated with the other LSP.

In a ninth implementation, alone or in combination with one or more of the first through eighth implementations, process 500 includes receiving, based on sending the second copy of the message, one or more messages associated with a termination operation that is associated with the other LSP.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

Figure 6:
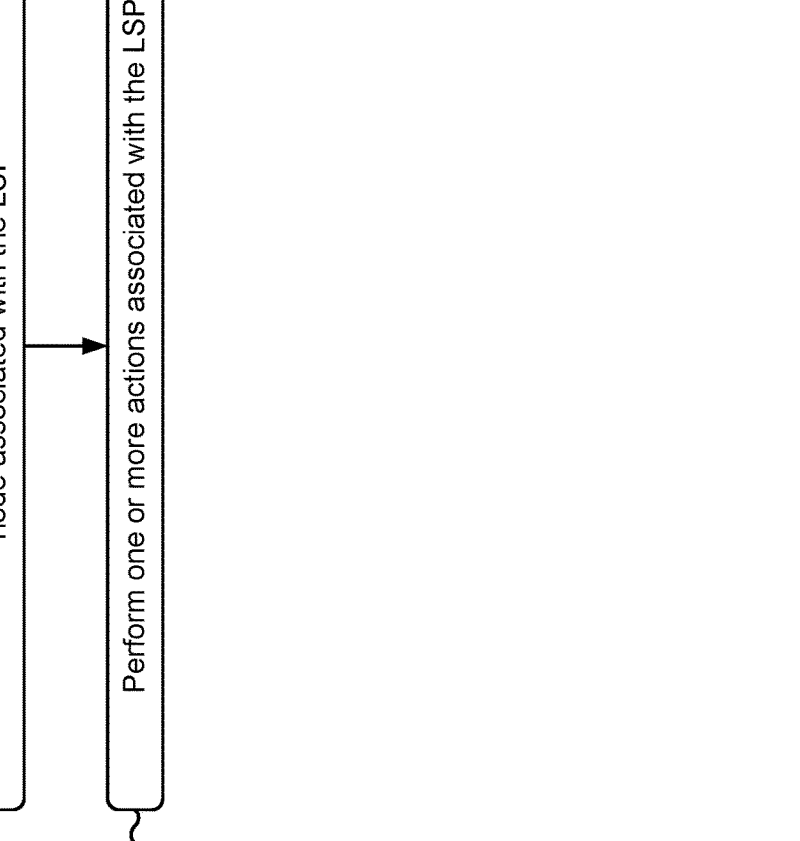
FIG. 6 is a flowchart of an example process associated with providing a message associated with a performance issue of a transit node that is associated with an LSP.

FIG. 6 is a flowchart of an example process 600 associated with providing a message associated with a performance issue of a transit node that is associated with an LSP. In some implementations, one or more process blocks of FIG. 6 are performed by an ingress node (e.g., ingress node 210) associated with an LSP. In some implementations, one or more process blocks of FIG. 6 are performed by another device or a group of devices separate from or including the ingress node, such as a transit node (e.g., transit node 220) and/or an egress node (e.g., egress node 230). Additionally, or alternatively, one or more process blocks of FIG. 6 may be performed by one or more components of device 300, such as processor 320, memory 330, input component 340, output component 350, and/or communication component 360; one or more components of device 400, such as input component 410, switching component 420, output components 430, and/or controller 440; and/or one or more other components.

As shown in FIG. 6, process 600 may include receiving a message associated with a performance issue of a transit node associated with the LSP (block 610). For example, the ingress node may receive, from a transit node associated with the LSP, a message associated with a performance issue of the transit node, as described above.

As further shown in FIG. 6, process 600 may include performing one or more actions associated with the LSP (block 620). For example, the ingress node may perform, based on the message, one or more actions associated with the LSP, as described above.

Process 600 may include additional implementations, such as any single implementation or any combination of implementations described below and/or in connection with one or more other processes described elsewhere herein.

In a first implementation, performing the one or more actions associated with the LSP includes performing, based on the message, an assessment operation associated with the LSP.

In a second implementation, alone or in combination with the first implementation, performing the one or more actions associated with the LSP includes sending, based on the message, one or more messages associated with an assessment operation that is associated with the LSP, wherein the one or more messages are to propagate, via the LSP, to the transit node.

In a third implementation, alone or in combination with one or more of the first and second implementations, performing the one or more actions associated with the LSP includes initiating, based on the message, a termination operation associated with the LSP.

In a fourth implementation, alone or in combination with one or more of the first through third implementations, performing the one or more actions associated with the LSP includes sending one or more messages associated with a termination operation that is associated with the LSP, wherein the one or more messages are to propagate, via the LSP, to the transit node.

Although FIG. 6 shows example blocks of process 600, in some implementations, process 600 includes additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
identifying, by a transit node associated with a label switched path (LSP) and based on monitoring telemetry data associated with the transit node, one or more trap codes or one or more exception codes associated with the transit node;
identifying, by the transit node and based on analyzing the one or more trap codes or the one or more exception codes, a performance issue of the transit node;
generating, by the transit node and based on identifying the performance issue, a first message that is a first copy of a message associated with the performance issue;
transmitting, by the transit node, and to an ingress node associated with the LSP, the first message to allow the ingress node to perform one or more actions associated with the LSP, wherein the one or more actions include:
causing, based on transmitting the first message, initiation of a termination operation associated with the LSP;
transmitting, by the transit node and to another ingress node associated with another LSP that includes the transit node, a second message, wherein the second message is a second copy of the message; and
causing, based on transmitting the second message, the other ingress node to perform one or more other actions associated with the other LSP.

2. The method of claim 1, wherein transmitting the first message allows the ingress node to perform an assessment operation associated with the LSP.

3. The method of claim 1, further comprising: receiving, based on transmitting the first message, one or more messages associated with an assessment operation that is associated with the LSP.

4. The method of claim 1, further comprising: receiving, based on transmitting the first message, one or more messages associated with the termination operation.

5. The method of claim 1, wherein transmitting the second message allows the other ingress node to perform an assessment operation associated with the other LSP.

6. The method of claim 1, further comprising: receiving, based on transmitting the second message, one or more messages associated with an assessment operation that is associated with the other LSP.

7. The method of claim 1, further comprising: receiving, based on transmitting the second message, one or more messages associated with another termination operation that is associated with the other LSP.

8. The method of claim 1, wherein the one or more actions or the one or more other actions include at least one of:
an LSP self-ping operation,
an LSP ping operation, or
another assessment operation configured to assess an LSP status.

9. The method of claim 1, wherein the message is in an extended format of a resource reservation protocol (RSVP) path error message to support an error specification object.

10. An ingress node associated with a label switched path (LSP), comprising:
one or more memories; and
one or more processors to:
receive, from a transit node associated with the LSP, a first message that is a first copy of a message associated with a performance issue of the transit node, wherein the performance issue is identified by the transit node based on analyzing one or more trap codes or one or more exception codes associated with the transit node;
cause, based on the first message, initiation of a termination operation associated with the LSP,
wherein a second message that is a copy of the message is sent to another ingress node that is associated with another LSP that includes the transit node; and
perform, based on the message, one or more actions associated with the LSP.

11. The ingress node of claim 10, wherein the one or more processors, to perform the one or more actions associated with the LSP, are to:
perform, based on the message, an assessment operation associated with the LSP.

12. The ingress node of claim 10, wherein the one or more processors, to perform the one or more actions associated with the LSP, are to:
transmit, based on the message, one or more messages associated with an assessment operation that is associated with the LSP,
wherein the one or more messages are transmitted, via the LSP, to the transit node.

13. The ingress node of claim 10, wherein the one or more processors, to perform the one or more actions associated with the LSP, are to:
transmit one or more messages associated with the termination operation,
wherein the one or more messages are propagated to the transit node via the LSP.

14. The ingress node of claim 10, wherein the message is in an extended format of a resource reservation protocol (RSVP) path error message to support an error specification object.

15. A non-transitory computer-readable medium storing a set of instructions, the set of instructions comprising:

one or more instructions that, when executed by one or more processors of a transit node associated with a label switched path (LSP), cause the transit node to:

identify, based on monitoring telemetry data associated with the transit node, one or more trap codes or one or more exception codes associated with the transit node;

identify, based on analyzing the one or more trap codes or the one or more exception codes, a performance issue of the transit node;

generate, based on identifying the performance issue, a first message that is a copy of a message associated with the performance issue;

transmit, to an ingress node associated with the LSP, the first message to allow the ingress node to perform one or more actions associated with the LSP, wherein the one or more actions include:

causing, based on transmitting the first message, initiation of a termination operation associated with the LSP;

transmit, by the transit node and to another ingress node associated with another LSP that includes the transit node, a second message, wherein the second message is a second copy of the message; and cause, based on transmitting the second message, the other ingress node to perform one or more other actions associated with the other LSP.

16. The non-transitory computer-readable medium of claim 15, wherein the one or more actions include an assessment operation that is an LSP self-ping assessment operation or an LSP ping assessment operation.

17. The non-transitory computer-readable medium of claim 15, wherein the one or more instructions, when executed by the one or more processors, further cause the transit node to:

receive, based on transmitting the message, one or more messages associated with an assessment operation that is associated with the LSP.

18. The non-transitory computer-readable medium of claim 15, wherein the one or more instructions, when executed by the one or more processors, further cause the transit node to:

receive, based on transmitting the message, one or more messages associated with the termination operation that is associated with the LSP.

19. The non-transitory computer-readable medium of claim 15, wherein the message is in an extended format of a resource reservation protocol (RSVP) path error message to support an error specification object.

20. The non-transitory computer-readable medium of claim 19, wherein the message includes instructions to perform at least one of the one or more actions or the one or more other actions.

\* \* \* \* \*